March 17, 1925.

L. E. BUFTON

EXPANSION JOINT

Filed July 7, 1923

1,530,105

2 Sheets-Sheet 1

WITNESSES

INVENTOR
Lawrence E. Bufton

March 17, 1925.
L. E. BUFTON
1,530,105
EXPANSION JOINT
Filed July 7, 1923
2 Sheets-Sheet 2
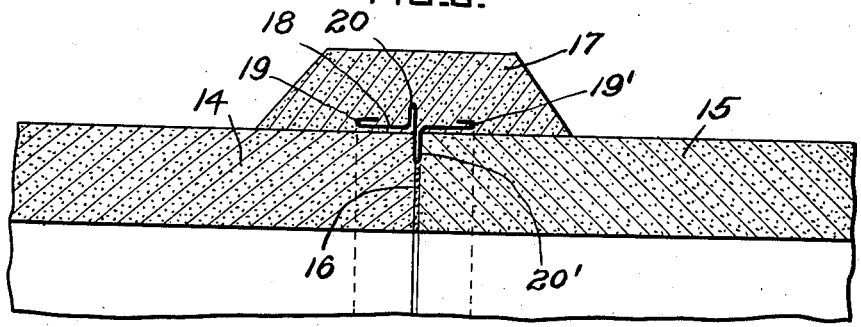
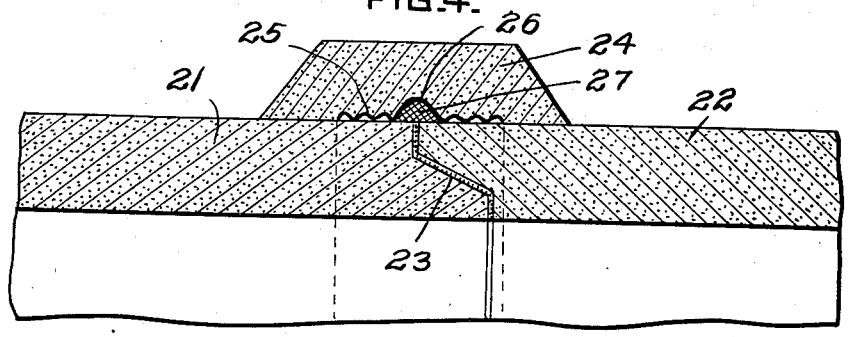
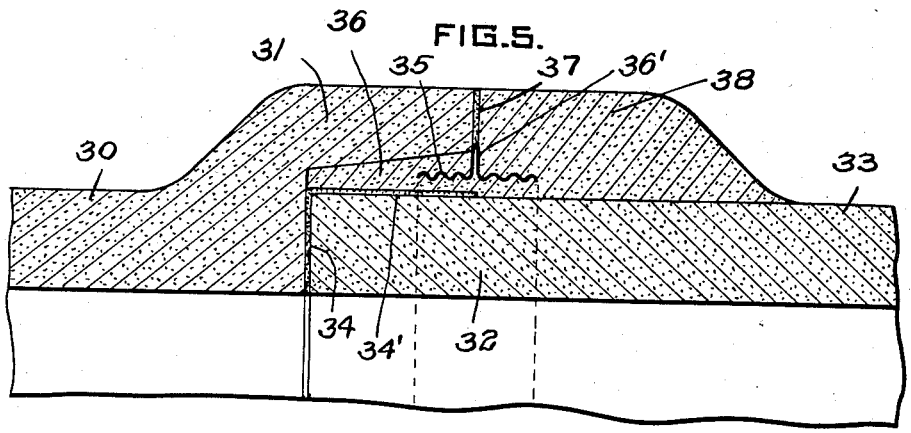
WITNESSES
J. Herbert Bradley.
C. R. Halbert.
INVENTOR
Lawrence E. Bufton
By Winter & Brown
His Attys.

Patented Mar. 17, 1925.

1,530,105

UNITED STATES PATENT OFFICE.

LAWRENCE E. BUFTON, OF SPOKANE, WASHINGTON.

EXPANSION JOINT.

Application filed July 7, 1923. Serial No. 650,139.

*To all whom it may concern:*

Be it known that I, LAWRENCE E. BUFTON, a citizen of the United States, and a resident of Spokane, State of Washington, have invented a new and useful Improvement in Expansion Joints, of which the following is a specification.

This invention relates to concrete pipes, and particularly to an expansion joint for connecting the abutting ends of pipe sections.

It is an object of the invention to provide a simple, compact and economical form of expansion joint for concrete pipes which will effectively assure a water-tight joint between the pipe sections under all conditions of expansion and contraction thereof.

Heretofore, many expansions joints have either been somewhat complicated either requiring a special formation of the ends of the pipe sections in order to utilize or accommodate the joint proper, or were capable of being applied only to pipes of comparatively large diameters. It is a special object of this invention to provide an expansion joint which is capable of being directly used with ordinary standard forms of pipe sections without alteration, which may be easily applied to the exterior thereof, which enhances rather than weakens the pipe lines, and which is capable of use in connection therewith irrespective of the size of the pipe.

These and other objects of the invention will more fully appear when taken in conjunction with the following description and the appended claims.

Figure 1:
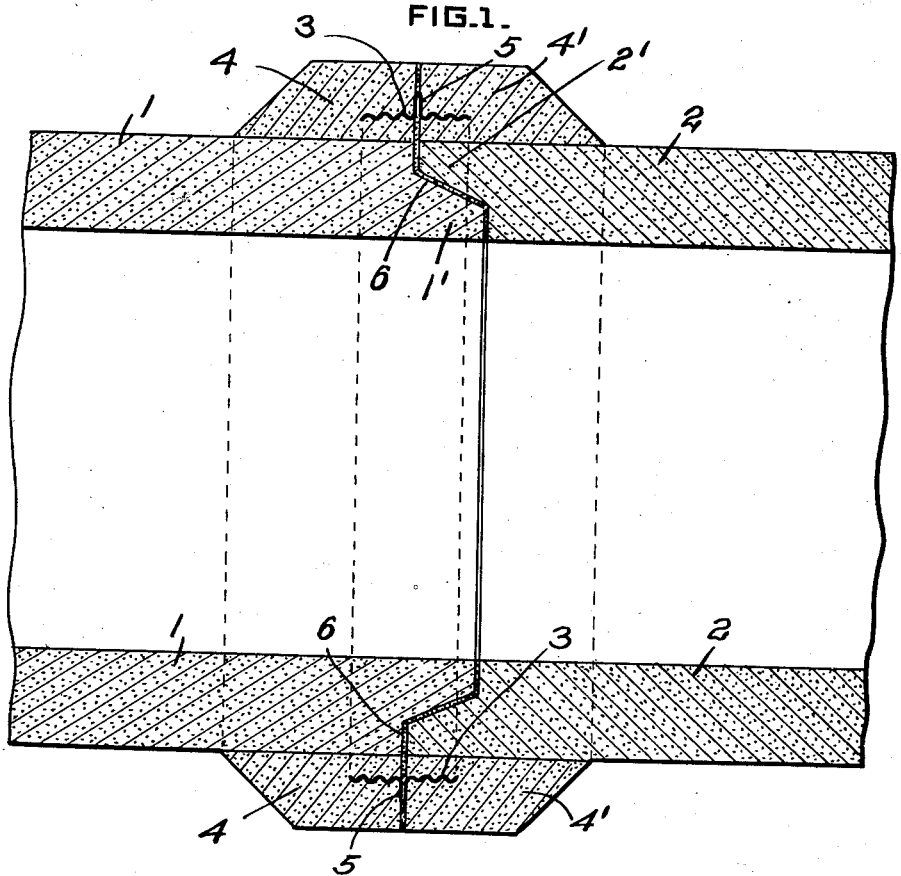
Figure 2:
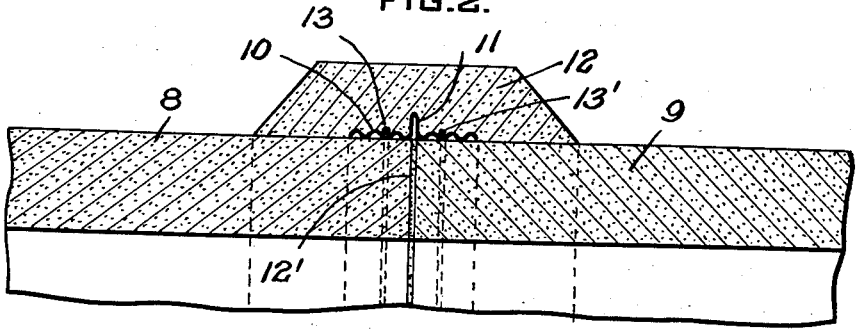

In the accompanying drawings, Fig. 1 is a fragmentary sectional view illustrating one embodiment of the invention; Fig. 2 a similar view illustrating a modified form of the invention in which special bands are employed in connection with the sealing cylinder; Figs. 3 and 4 similar views illustrating other modified forms of the invention; and Fig. 5 a similar view illustrating the application of the invention to pipe sections equipped with bell and spigot terminals.

In Fig. 1, the terminals of the abutting pipe sections are indicated at 1 and 2, the end faces of the pipe sections being of a well known configuration so as to provide overlapping portions 1' and 2', formed on the sections 1 and 2, respectively. The sections 1 and 2 correspond to a well known standard form of concrete pipe which is commonly employed, and well known in different sizes of concrete pipes. Surrounding the pipe sections and spaced a slight distance outwardly therefrom is the sealing ring or cylinder 3 overlying the parting joint formed between the faces of the pipe sections and embedded in an external collar comprising the collar sections 4 and 4'. The sealing ring or cylinder 3 is preferably corrugated throughout its length and at a point substantially midway between its ends is folded upon itself so as to form the fold or crimp 5. In the embodiment shown in this figure, the crimp 5 is disposed so as to directly overlie the joint formed by the abutting faces of the pipe sections 1 and 2. Interposed between the faces of the pipe sections and the abutting faces of the collar sections 4 and 4' is a thin layer of asphaltum 6, ordinarily providing a water-tight connection, and effectively separating the abutting ends of pipes 1 and 2, and collar sections 4 and 4'.

In assembling the pipe sections, the end faces thereof are first painted with a thin layer or film of asphaltum, the sections then brought into abutting relation as shown in the drawings, with the sealing ring 3 embracing the adjacent ends of the sections. The collar section 4 which is constructed of a suitable cementitious material, preferably concrete, is then cast around the pipe section 1 so as to extend throughout the left-hand portion of the sealing cylinder, leaving the fold or crimp 5 contiguous in its end face, and the right-hand portion of the sealing ring projecting outwardly therefrom. The end face of the collar section 4 is then painted or coated with the layer of asphaltum 6 throughout its entire extent, and the concrete collar section 4' then cast, as shown, so as to embed the projecting portion of the sealing ring. With the collar formed in this manner, the sealing ring spans the line of parting between the end faces of the pipe sections, the entire sealing ring being embedded within the material of the external collar, with the crimp or fold 5 in effective position to permit a straightening of the crimp or fold and an elongation of the sealing ring or cylinder whenever separation due to contraction or settlement between the pipe sections occurs, and expansion of the pipe sections is accommodated in obvious fashion. In this manner, the expansion joint described assures a water-tight joint at all times.

In the form illustrated in Fig. 2, the pipe sections 8 and 9 are provided with plain end faces forming a strictly radial parting joint instead of the tortuous path produced by the overhanging portions in the embodiment of Fig. 1. The pipe sections 8 and 9 are also of a well known standard type. The sealing cylinder is indicated at 10, and corresponds generally to the form of the cylinder 3, previously described, the intermediate fold or crimp 11 being disposed in alignment with the parting joint which is filled with a layer of asphaltum 12. In this modification the sealing ring lies in intimate relation with the terminals of the pipe sections 8 and 9 instead of being spaced outwardly therefrom, and is held in position during the casting of the external collar 12 by means of wires or equivalent elements 13 and 13'. The collar 12 instead of being formed in two sections, in this instance, is formed as a single annulus embedding the sealing cylinder and overhanging the terminals of both of the pipe sections.

In forming the joint illustrated in Fig. 2, the end faces of the pipe sections 8 or 9 are painted with asphaltum as in the first described embodiment, and are brought into intimate contact with the sealing cylinder in the position shown in the drawings. The clamping or positioning wires or rings 13, 13' are then applied, and the external concrete collar 12 cast upon the pipe sections.

The mode of operation of this form is obvious from that previously set forth, the fold or crimp 11 lying immediately over the parting joint 12 and reducing the strength of the collar 12 throughout the joint surrounding the central fold. Consequently a line of cleavage through the collar is provided whenever separation of the pipe sections 8 and 9 occurs due to contraction, at which time the collar 12 will crack or break at a point immediately surrounding the crimp 11. It is clear that upon separation of the pipe sections, the sealing cylinder will maintain a water-tight joint therebetween.

In the form illustrated in Fig. 3, the pipe sections 14 and 15 correspond to the sections of Fig. 2, having the interposed layer of asphaltum 16 and the unitary annular external collar 17. The sealing ring 18, however, is slightly different from those previously described in that the extremities 19, 19', are turned inwardly towards its intermediate portion to form anchoring terminals, while the intermediate portion is bent upon itself so as to form the oppositely extending folds or crimps 20, 20'. the crimp 20' lying between the abutting faces of the pipe sections 14, while the crimp 20 projects radially outwards and acts in a manner corresponding to the crimp 11. The mode of operation of this form is obvious from that described in connection with the previous modifications.

The pipe sections of the modification illustrated in Fig. 4 correspond to those employed in the embodiment of Fig. 1 as indicated at 21 and 22, respectively, the end faces of the pipe sections being painted to form an interposed layer of asphaltum 23. The external encircling collar 24 also corresponds to the unitary structure previously described in connection with Figs. 2 and 3. In this embodiment the sealing cylinder 25 is corrugated adjacent its opposite extremities and is provided at its intermediate portion with a crimp or fold formed by an enlarged corrugation 26 which cooperates with the peripheral surfaces adjacent the extremities of the pipe sections 21 and 22 to form an annular chamber which is filled with asphaltum 27 functioning as a compressible sealing annulus.

In this modification, the line of cleavage through the collar 24 also surrounds the intermediate portion 26 of the sealing cylinder, as in the previously described forms, and functions in analogous manner upon contraction or settlement of the pipes. During elongation of the sealing cylinder the enlarged corrugation 26 flattens, such action being readily permitted due to the elastic qualities of the annulus of asphaltum 27.

The application of the invention to a standard type of bell and spigot connection is illustrated in Fig. 5 of the drawings. The pipe section 30 is provided with the usual bell 31 which is adapted to receive the spigot 32 of the pipe section 33. In this form, the peripheral surface of the spigot 32 as well as its end face is painted with asphaltum so as to provide a layer 34—34' thereof extending between the pipe sections and to a point corresponding to the end face of the bell 31. The sealing cylinder 35 corresponds in structure to the form previously described in connection with the embodiment illustrated in Fig. 1, with the intermediate crimp or fold 36 positioned in a plane corresponding to the end face of the bell. The sealing ring in this instance is also spaced radially outwards from the spigot terminal 32.

The modified embodiment of Fig. 5 is formed as follows:—The end face and peripheral surface of the spigot 32 is painted with asphaltum to the point indicated in the drawings and the spigot inserted into abutting relation with the bell, with the sealing cylinder 35 positioned as shown. The annular space between the bell and spigot is then filled with the cementitious material 36 which embeds the left-hand portion of the sealing ring, leaving the right-hand portion of the sealing ring projecting outwardly therefrom. The exposed end face of the bell is then painted to form the asphaltum coat 37, after which the collar 38 is cast around the pipe section 33 and thoroughly embedding the sealing cylinder therein.

The crimp 36 is thus located not only in alignment with the end face of the bell as defined by the layer of asphaltum 37, but also in alignment with the plane passing through the limit defined by the asphaltum layer 34′. Any separation of the pipe sections due to contraction or settlement will therefore tend to cause cleavage in a plane corresponding to the crimp 36, in which case the sealing cylinder 35 elongates but assures a water-tight joint between the pipe sections as in the previously described embodiments.

It is thus seen that applicant's invention provides a novel and unique form of expansion joint for concrete pipes, which is simple, compact and effective in operation, which is adapted to be readily applied externally to the several forms of standard pipe sections without alteration thereof, and which is adapted for use in connection with such pipes regardless of their size.

While applicant has particularly illustrated the preferred embodiment of the invention, as required by the patent statutes, it is apparent that many changes may be made in the exact details of construction and the association of the several parts. It is therefore not intended to limit the invention beyond that particularly pointed out and defined by the appended claims.

I claim:

1. An expansion joint for concrete pipes comprising abutting pipe sections, an expansible sealing cylinder disposed upon the exterior and embracing one of said sections, and an external collar embedding the said cylinder.

2. An expansion joint for concrete pipes comprising abutting standard pipe sections, an elongatable sealing cylinder surrounding one of said sections, and a collar of cementitious material embedding said cylinder.

3. An expansion joint for concrete pipes comprising abutting standard pipe sections, a metallic sealing cylinder having its intermediate portion folded upon itself surrounding one of said sections, said folded portion lying adjacent the end face of the remaining section, and an external collar of cementitious material embedding the said cylinder.

In testimony whereof I sign my name.

LAWRENCE E. BUFTON.